US008855666B2

(12) United States Patent
Yamagishi et al.

(10) Patent No.: US 8,855,666 B2
(45) Date of Patent: Oct. 7, 2014

(54) LOCATION REGISTRATION PROCESSING METHOD AND MOBILE STATION

(75) Inventors: Hiroaki Yamagishi, Yokohama (JP); Hideyuki Sakuramoto, Yokosuka (JP); Takehiro Ida, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 272 days.

(21) Appl. No.: 12/990,150

(22) PCT Filed: Apr. 30, 2009

(86) PCT No.: PCT/JP2009/058471
§ 371 (c)(1),
(2), (4) Date: Jan. 10, 2011

(87) PCT Pub. No.: WO2009/133922
PCT Pub. Date: Nov. 5, 2009

(65) Prior Publication Data
US 2011/0117929 A1    May 19, 2011

(30) Foreign Application Priority Data

May 2, 2008    (JP) ................. 2008-120551

(51) Int. Cl.
*H04W 24/00*    (2009.01)
*H04W 60/04*    (2009.01)
*H04W 48/12*    (2009.01)
*H04W 4/00*     (2009.01)

(52) U.S. Cl.
CPC .............. *H04W 60/04* (2013.01); *H04W 48/12* (2013.01); *H04W 4/00* (2013.01)
USPC ........ 455/456.1; 455/458; 455/450; 370/328; 370/312; 375/267

(58) Field of Classification Search
CPC ........ H04W 60/04; H04W 48/12; H04W 4/00
USPC ........ 455/433, 435.1, 436, 437, 404.1, 404.2, 455/456.1–457, 466, 458, 450; 370/252, 370/350, 331, 328, 312; 375/267; 712/204
See application file for complete search history.

(56) References Cited

U.S. PATENT DOCUMENTS 5,845,211 A * 12/1998 Roach, Jr. .................... 455/436
6,038,445 A *  3/2000 Alperovich et al. ........ 455/432.1
(Continued)

FOREIGN PATENT DOCUMENTS

| JP | 2006-5878 A    | 1/2006 |
| JP | 2006-67447 A   | 3/2006 |
| JP | 2007-116561 A  | 5/2007 |

OTHER PUBLICATIONS

3GPP TS 36.331 V8.1.0, "Technical Specification Group Radio Access Network; Evolved Universal Terrestrial Radio Access (E-UTRA) Radio Resource Control (RRC)," Mar. 2008, 122 pages.

(Continued)

*Primary Examiner* — Mahendra Patel
(74) *Attorney, Agent, or Firm* — Osha Liang LLP

(57) ABSTRACT

A location registration processing method according to the present invention includes steps of: starting, at a mobile station (UE), the location registration processing on the basis of predetermined system information, when acquiring the predetermined system information among a plurality of pieces of system information broadcasted by a radio base station (eNB), the predetermined system information including information necessary for performing the location registration processing; and acquiring the rest of the plurality of pieces of system information.

10 Claims, 3 Drawing Sheets

(56) References Cited

U.S. PATENT DOCUMENTS

| | | | |
|---|---|---|---|
| 6,810,259 B1* | 10/2004 | Zhang | 455/456.5 |
| 7,747,257 B2* | 6/2010 | Zhao et al. | 455/456.1 |
| 7,869,808 B2* | 1/2011 | Kojima | 455/437 |
| 2004/0110515 A1* | 6/2004 | Blumberg et al. | 455/456.1 |
| 2005/0192024 A1 | 9/2005 | Sheynblat | |
| 2005/0239461 A1* | 10/2005 | Verma et al. | 455/435.1 |
| 2006/0046748 A1* | 3/2006 | Shinozaki | 455/456.6 |
| 2008/0057948 A1* | 3/2008 | Mittal et al. | 455/426.1 |
| 2008/0108346 A1* | 5/2008 | Umatt et al. | 455/432.1 |
| 2008/0212522 A1* | 9/2008 | Ko et al. | 370/328 |
| 2008/0242297 A1* | 10/2008 | Lee et al. | 455/434 |
| 2008/0267309 A1* | 10/2008 | Saini et al. | 375/267 |
| 2009/0221293 A1* | 9/2009 | Petrovic et al. | 455/450 |
| 2011/0019615 A1* | 1/2011 | Krco et al. | 370/328 |

OTHER PUBLICATIONS

International Search Report issued in PCT/JP2009/058471, mailed on Jun. 2, 2009, with translation, 4 pages.

Written Opinion issued in PCT/JP2009/058471, mailed on Jun. 2, 2009, 3 pages.

European Search Report for Application No. 09738859.9, mailed on Mar. 3, 2011, 5 pages.

Office Action issued in Canadian Patent Application No. 2,725,469, mailing date Jan. 20, 2014 (3 pages).

Office Action issued in corresponding Canadian Application No. 2725469 mailed May 17, 2013 (3 pages).

* cited by examiner

LOCATION REGISTRATION PROCESSING METHOD AND MOBILE STATION

TECHNICAL FIELD

The present invention relates to a location registration processing method in which a mobile station performs location registration processing, and also relates to the mobile station.

BACKGROUND ART

Generally, a mobile station UE is configured to receive broadcast information broadcasted in cells, when turned on by a user, and to execute an Attach procedure on the basis of the broadcast information.

In this respect, the mobile station UE cannot receive a supply of communication services such as calling and receiving of calls unless the mobile station completes the location registration processing by the Attach procedure.

The mobile station UE is also configured to perform the location registration processing, when changing the location registration area as a result of making cell selection or cell reselection.

SUMMARY OF INVENTION

Problem to be Solved by the Invention

However, there is a problem that it takes time for the mobile station UE to get ready to receive the supply of communication services after the mobile station UE is turned on. This is because it takes about one second for the mobile station UE to receive the broadcast information and it takes about 100 ms for the mobile station UE to execute the Attach procedure.

Likewise, also in a case where the location registration area is to be changed as a result of performing cell selection or cell reselection, there is a problem that the mobile station UE requires certain time to perform the location registration processing and then to get ready to receive the supply of communication services.

The present invention has been made in view of the above problems, and an object of the present invention is to provide a location registration processing method and a mobile station which are capable of reducing as much as possible time from when location registration processing becomes necessary to when the mobile station gets ready to receive a supply of communication services.

Solution to Problem

A first aspect of the present invention is summarized as a location registration processing method in which a mobile station performs location registration processing, the method including the step of: starting, at the mobile station, the location registration processing on the basis of predetermined system information, when acquiring the predetermined system information among a plurality of pieces of system information broadcasted by a radio base station, and before completing acquiring the rest of the plurality of pieces of system information, the predetermined system information including information necessary for performing the location registration processing.

In the first aspect, the location registration processing method can further include the step of: acquiring the rest of the plurality of pieces of system information after the location registration processing is started.

In the first aspect, the predetermined system information can include MIB, SIB 1, and SIB 2.

A second aspect of the present invention is summarized as a mobile station including a location registration processor unit configured to start a location registration processing on the basis of predetermined system information, when acquiring the predetermined system information among a plurality of pieces of system information broadcasted by a radio base station, and before completing acquiring the rest of the plurality of pieces of system information, the predetermined system information including information necessary for performing the location registration processing.

In the second aspect, the mobile station can further include an acquiring unit configured to acquire the rest of the plurality of pieces of system information after the location registration processing is started.

In the second aspect, the predetermined system information can include MIB, SIB 1, and SIB 2.

A third aspect of the present invention is summarized as a location registration processing method in which a mobile station performs location registration processing, the method including the step of: starting, at the mobile station, calling/receiving processing on the basis of predetermined system information, when acquiring the predetermined system information among a plurality of pieces of system information broadcasted by a radio base station, before completing acquiring the rest of the plurality of pieces of system information, and after completing the location registration processing, the predetermined system information including information necessary for performing the location registration processing.

A fourth aspect of the present invention is summarized as a mobile station including a calling-receiving processor unit configured to start calling/receiving processing on the basis of predetermined system information, when acquiring the predetermined system information among a plurality of pieces of system information broadcasted by a radio base station, before completing acquiring the rest of the plurality of pieces of system information, and after completing the location registration processing, the predetermined system information including information necessary for performing the location registration processing.

Advantageous Effects of Invention

As described above, according to the present invention, it is possible to provide a location registration processing method and a mobile station which are capable of reducing as much as possible time from when location registration processing becomes necessary to when the mobile station gets ready to receive a supply of communication services.

DESCRIPTION OF EMBODIMENT

Configuration of Mobile Communication System According to First Embodiment of the Present Invention A configuration of a mobile communication system according to a first embodiment of the present invention will be described with reference to FIG. 1 to FIG. 3.

Figure 1:
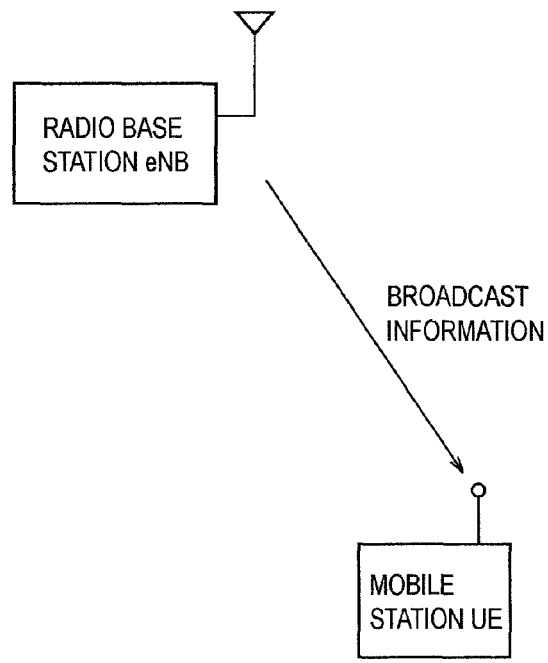
FIG. 1 is an overall configurational view of a mobile communication system according to a first embodiment of the present invention.

As shown in FIG. 1, in the mobile communication system according to the present embodiment, a mobile station UE is configured to perform location registration processing on the basis of multiple pieces of system information "MIB (Master Information Block)" and "SIBs (System Information Blocks) 1 to 8" which are included in broadcast information broadcasted by a radio base station eNB.

Figure 2:
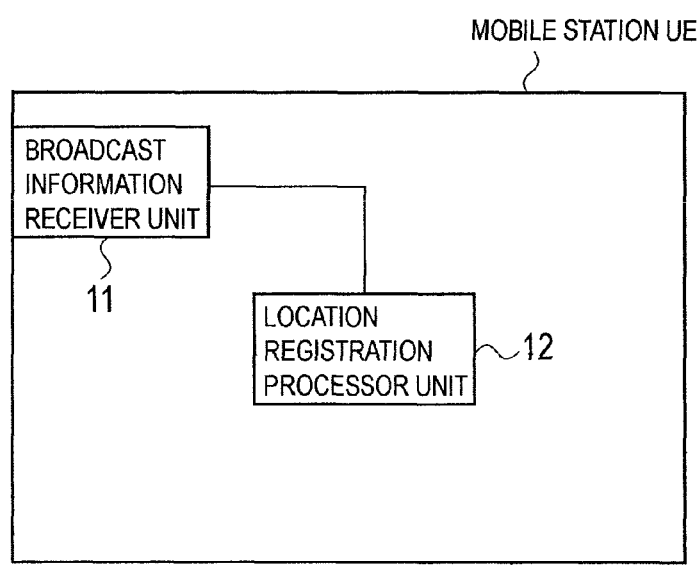
FIG. 2 is a functional block diagram of a mobile station according to the first embodiment of the present invention.

As shown in FIG. 2, the mobile station UE includes a broadcast information receiver unit 11 and a location registration processor unit 12.

The broadcast information receiver unit 11 is configured to receive multiple pieces of system information "MIB" and "SIBs 1 to 8" which are included in broadcast information broadcasted by the radio base station eNB.

The "MIB" is system information including a system frame number (SFN) and physical layer parameters such as a cell width, the number of antennas, and configuration information on a PHICH (Physical Hybrid-ARQ Indicator Channel). The "MIB" is mapped to and transmitted on a "P-BCH (Physical-Broadcast Channel)" on a PDSCH in cycles of 40 ms.

The "SIB 1" is system information including "PLMN (Public Land Mobile Network)-ID", "Tracking Area Code", "Cell-ID", cell barring information, scheduling information on the "SIBS 2 to 8", and the like. The "SIB 1" is mapped to and transmitted on "DL-SCH (Downlink-Shared Channel)" on a PDSCH in cycles of 80 MS.

The "SIB 2" includes access restriction information and the like, the "SIB 3" includes information on cell reselection of the mobile station itself, the "SIB 4" includes information such as information on accessible neighbor cells or inaccessible neighbor cells in the same frequency, and the "SIB 5" includes information such as information on accessible neighbor cells or inaccessible neighbor cells in different frequencies.

The "SIB 6" includes information such as priority and frequency list information in the UTRA scheme, the "SIB 7" includes information such as priority and frequency list information in the GERAN scheme, and the "SIB 8" includes information such as priority and frequency list information in the CDMA2000 scheme.

Among these, predetermined system information including information that the mobile station UE needs for performing the location registration processing includes the "MIB", the "SIB 1", and the "SIB 2". Here, the "SIBs 3 to 8" are pieces of system information which include information that the mobile station UE needs for performing cell selection or cell reselection.

Specifically, each of the "SIB 3" to the "SIB 8" includes information necessary to support mobility of the mobile station UE in an idle mode.

The location registration processor unit 12 is configured to perform location registration processing by an Attach procedure at the time when the mobile station UE is turned on. Moreover, the location registration processor unit 12 is configured to perform location registration processing also in a case where the mobile station UE needs a change in its location registration area as a result of cell selection or cell reselection.

Specifically, the location registration processor unit 12 is configured to start location registration processing on the basis of predetermined system information "MIB", "SIB 1", and "SIB 2", which includes information necessary for performing the location registration processing, among multiple pieces of system information "MIB" and "SIBs 1 to 8" broadcasted by the ratio base station eNB, when the mobile station UE acquires the predetermined system information "NIB", "SIB 1", and "SIB 2".

Here, the broadcast information receiver unit 11 is configured to acquire the rest "SIBs 3 to 8" of the multiple pieces of system information during the performance of the location registration processing.

Note that the location registration processor unit 12 may complete the location registration processing, before the broadcast information receiver unit 11 completes acquiring the rest "SIBs 3 to 8" of the multiple pieces of system information. In this case, the mobile station UE can receive a supply of communication services after completing the location registration processing.

Figure 3:
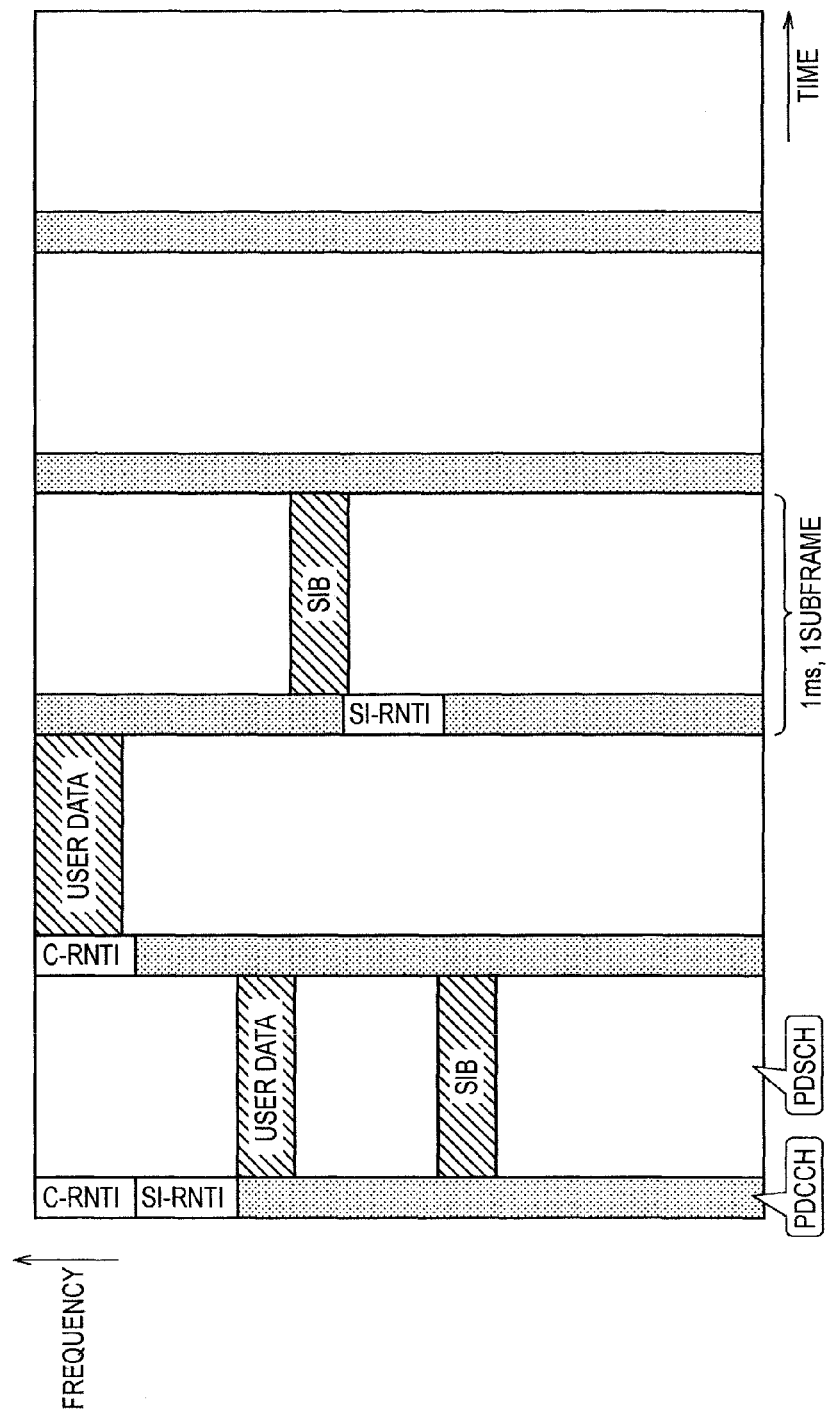
FIG. 3 is a view showing an example of broadcast information transmitted by a radio base station according to the first embodiment of the present invention.

In addition, as shown in FIG. 3, the broadcast information receiver unit 11 can receive the pieces of system information "SIBs 3 to 8" which are transmitted together with user data, via a "PDSCH (Physical Downlink Shared Channel)" corresponding to a "PDCCH (Physical Downlink Control Channel)", including "C-RNTI (Cell-Radio Network Temporary Identifier)" or "SI-RNTI (System Information-Radio Network Temporary Identifier)".

(Operation of Mobile Communication System According to First Embodiment of the Present Invention)

An example of an operation of the mobile communication system according to the first embodiment of the present invention will be described with reference to FIG. 4.

Figure 4:
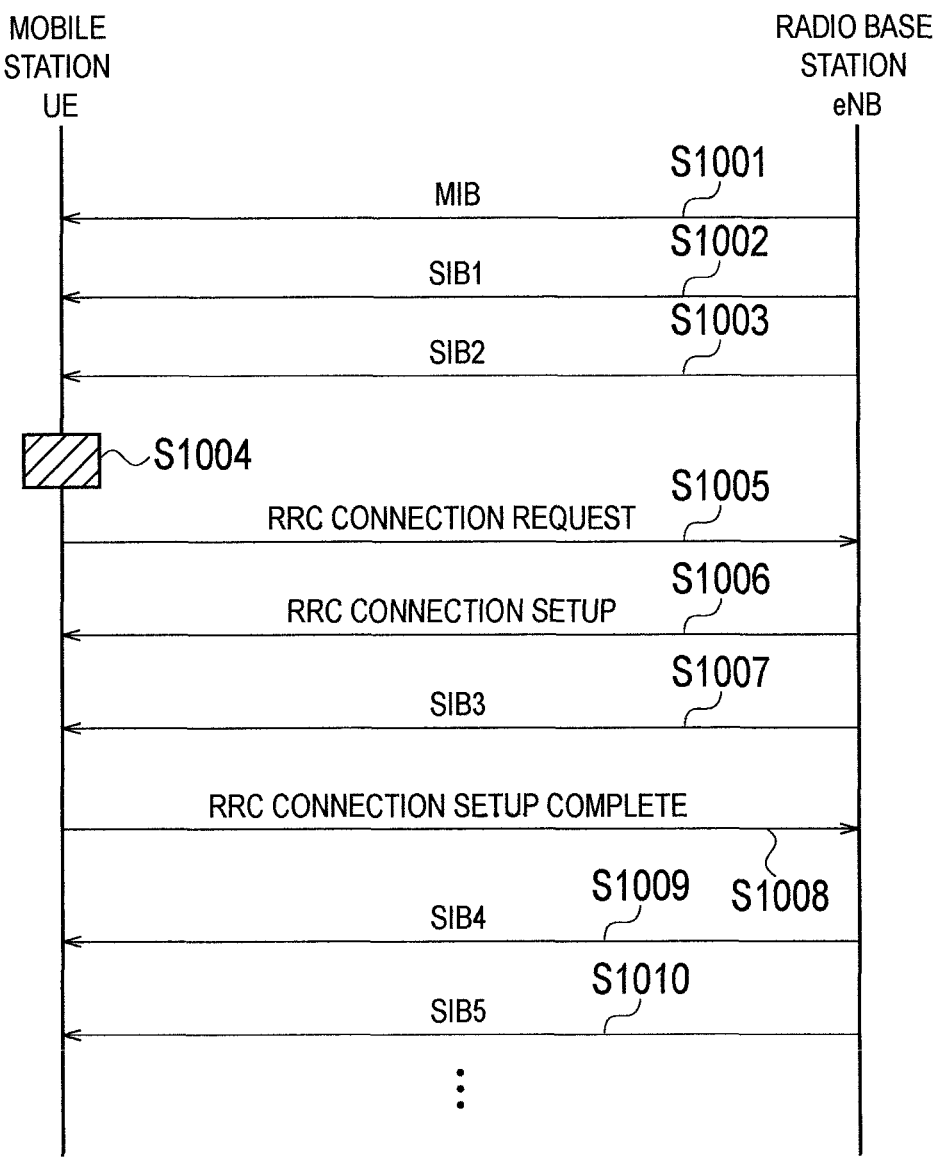
FIG. 4 is a sequence diagram showing an example of an operation of the mobile communication system according to the first embodiment of the present invention.

As shown in FIG. 4, a radio base station eNB broadcasts the "MIB" to a particular cell in Step S1001, broadcasts the "SIB 1" to the particular cell in Step S1002, and broadcasts the "SIB 2" to the particular cell in Step S1003.

In Step S1004, a mobile station UE detects that the mobile station UE has acquired predetermined system information "MIB", "SIB 1", and "SIB 2" which includes information necessary for performing location registration processing. In Step S1005, the mobile station UE starts location registration processing by transmitting the "RRC CONNECTION REQUEST" to the radio base station eNB.

In Step S1006, the radio base station eNB transmits, to the mobile station UE, the "RRC CONNECTION SETUP" for notifying the mobile station UE of information necessary for establishing an RRC connection.

In Step S1007, the radio base station eNB transmits the "SIB 3" to the particular cell, even while the mobile station UE is in the course of the location registration processing.

In Step S1008, the mobile station UE transmits, to the radio base station eNB, the "RRC CONNECTION SETUP COMPLETE" for notifying the radio base station eNB that the establishment of the RRC connection has been completed.

Thereafter, the radio base station eNB broadcasts the "SIB 4" to the particular cell in Step S1009, and broadcasts the "SIB 5" to the particular cell in Step S1010.

In this respect, the sequence shown in FIG. 4 is an example. The steps may be changed in order between the broadcasting procedure of the "SIBs 3 to 8" by the radio base station eNB (Steps S1007, S1009, S1010, . . . ) and the procedure of establishing the RRC connection (Steps S1004, S1005, S1006, and S1008), since these procedures are independent of each other.

Note that the mobile station UE can perform calling/receiving processing after the completion of the location registration processing.

(Advantageous Effect of Mobile Communication System According to First Embodiment of the Present Invention)

In the mobile communication system according to the first embodiment of the present invention, a mobile station is configured to start location registration processing when having received the "MIB", the "SIB 1", and the "SIB 2" which include the minimum necessary information for performing the location registration processing, even though the mobile station has not received the remaining information the "SIBs 3 to 8" necessary for cell selection or cell reselection. For this reason, the mobile communication system according to the first embodiment of the present invention is capable of reducing time from when the location registration processing becomes necessary to when the mobile station becomes ready to receive a supply of communication services.

Note that operation of the above described mobile station UE and the radio base station eNB may be implemented by means of hardware, a software module executed by a processor, or a combination of both.

The software module may be provided in any type of storage medium such as an RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to the processor so that the processor can read and write information from and to the storage medium. Also, the storage medium may be integrated into the processor. Also, the storage medium and the processor may be provided in an ASIC. The ASIC may be provided in the mobile station UE and the radio base station eNB. Also, the storage medium and the processor may be provided in the mobile station UE and the radio base station eNB as a discrete component.

Hereinabove, the present invention has been described in detail using the above embodiment; however, it is apparent to those skilled in the art that the present invention is not limited to the embodiment described herein. Modifications and variations of the present invention can be made without departing from the spirit and scope of the present invention defined by the description of the scope of claims. Thus, what is described herein is for illustrative purpose, and has no intention whatsoever to limit the present invention.

The invention claimed is:

1. A location registration processing method in which a mobile station performs location registration processing using an RRC connection message based on a predetermined system information, the method comprising the step of
starting, at the mobile station, the location registration processing on the basis of a Master Information Block (MIB) and a first and a second System Information Block (SIB 1 to SIB 2), when acquiring the MIB and SIB 1 to SIB 2 among a plurality of pieces of system information broadcasted by a radio base station, and before completing acquiring the rest of the plurality of pieces of system information, the MIB and SIB 1 to SIB 2 comprising information necessary for performing the location registration processing,
wherein the plurality of pieces of system information comprises the MIB, the SIB 1 to SIB 2, and SIBs (System Information Blocks) 3 to 8; and
wherein SIBs 3 to 8 are pieces of system information which includes information that the mobile station UE needs for performing cell selection or cell reselection.

2. The location registration processing method according to claim 1 comprising the step of acquiring the rest of the plurality of pieces of system information after the location registration processing is started.

3. A mobile station comprising a location registration processor unit configured to start a location registration processing using an RRC connection message based on a predetermined system information and on the basis of a Master Information Block (MIB) and a first and a second System Information Block (SIB 1 to SIB 2), when acquiring the MIB and SIB 1 to SIB 2 among a plurality of pieces of system information broadcasted by a radio base station, and before completing acquiring the rest of the plurality of pieces of system information, the MIB and SIB 1 to SIB 2 comprising information necessary for performing the location registration processing,
wherein the plurality of pieces of system information comprises the MIB, the SIB 1 to SIB 2, and SIBs (System Information Blocks) 3 to 8; and
wherein SIBs 3 to 8 are pieces of system information which includes information that the mobile station UE needs for performing cell selection or cell reselection.

4. The mobile station according to claim 3 comprising an acquiring unit configured to acquire the rest of the plurality of pieces of system information after the location registration processing is started.

5. The location registration processing method according to claim 1, wherein the MIB comprises a system frame number (SFN) and physical layer parameters.

6. The mobile station of claim 3, wherein the MIB comprises a system frame number (SFN) and physical layer parameters.

7. The location registration processing method according to claim 1, wherein the SIB 1 comprises a PLMN (Public Land Mobile Network)-ID, Tracking Area Code, Cell-ID, cell barring information, and scheduling information on SIBs 2 to 8.

8. The mobile station of claim 3, wherein the SIB 1 comprises a PLMN (Public Land Mobile Network)-ID, Tracking Area Code, Cell-ID, cell barring information, and scheduling information on SIBs 2 to 8.

9. The location registration processing method according to claim 1, wherein the SIB 2 comprises access restriction information.

10. The mobile station of claim 3, wherein the SIB 2 comprises access restriction information.

* * * * *